Jan. 3, 1933.   L. N. YOHE ET AL   1,893,118
CONTROL SYSTEM FOR AILERONS
Filed Aug. 8, 1931   2 Sheets-Sheet 1
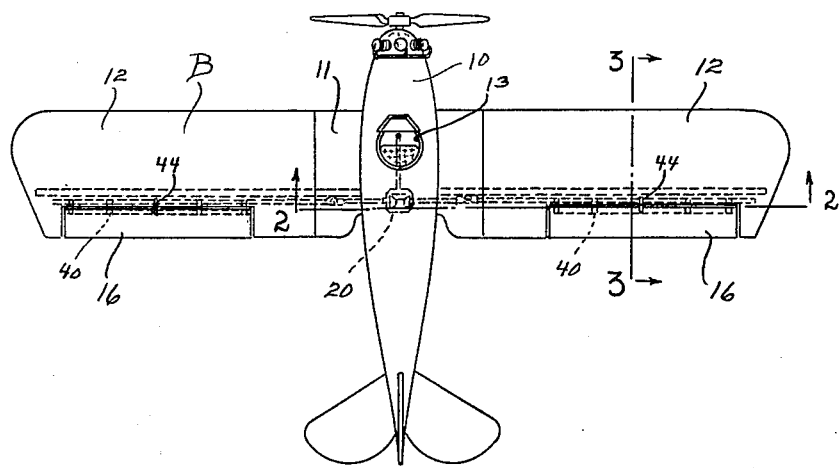
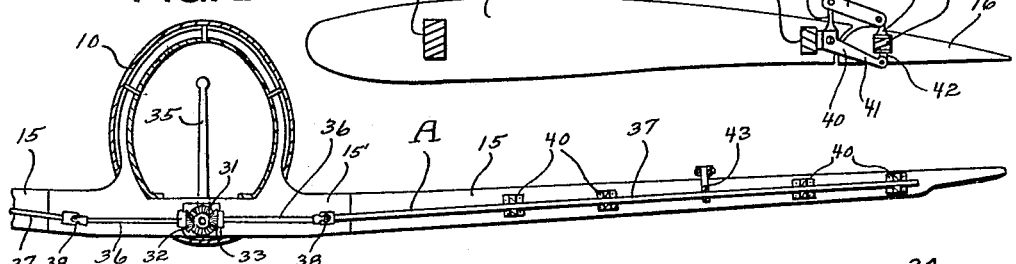
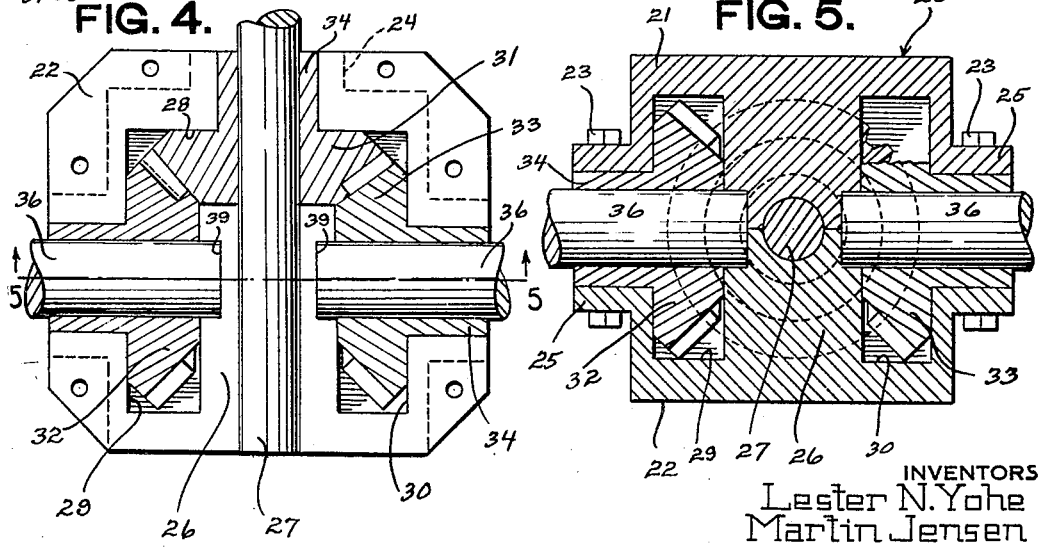
INVENTORS
Lester N. Yohe
Martin Jensen
BY Lancaster, Allwine and Rommel
ATTORNEYS.

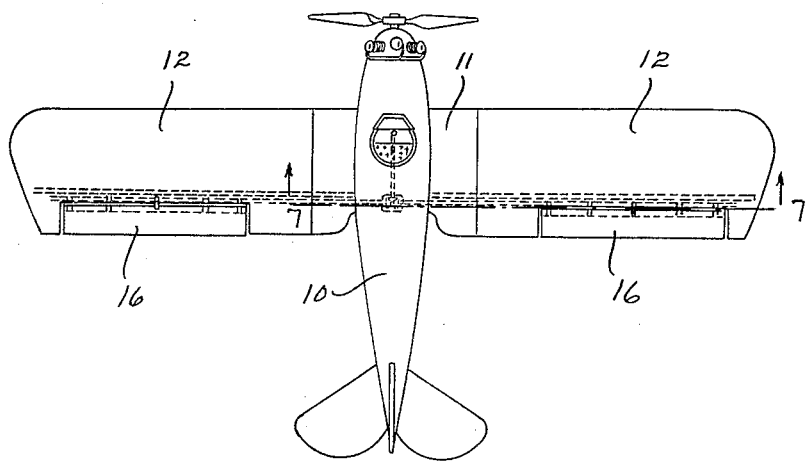
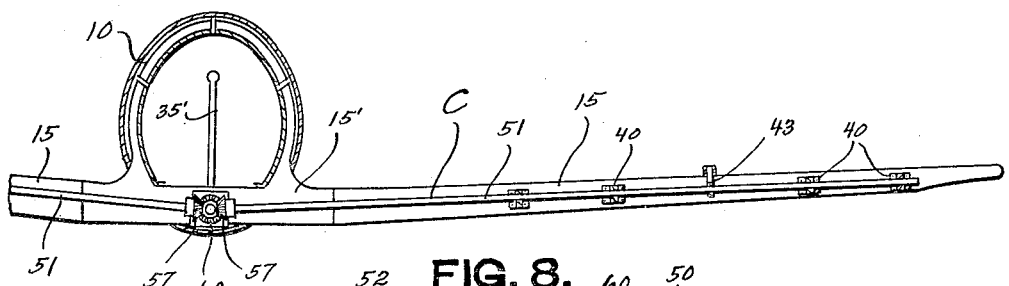
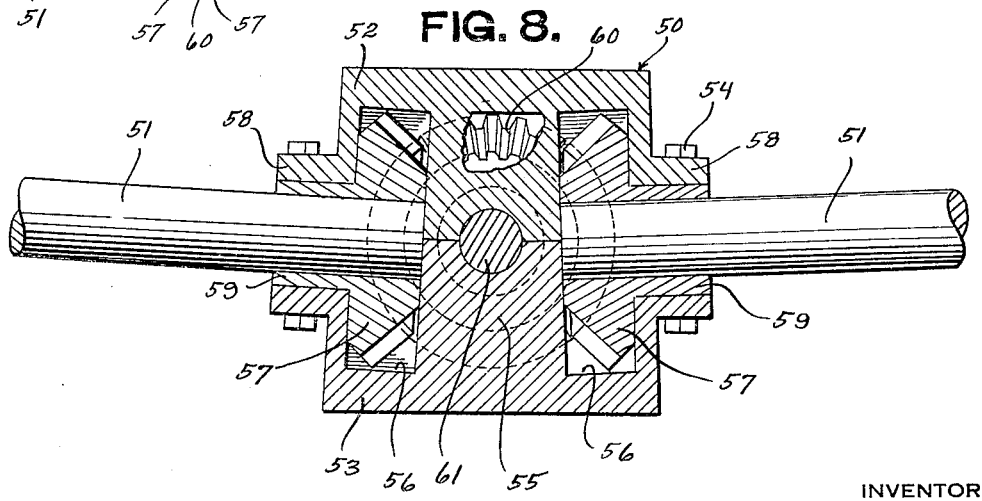

Patented Jan. 3, 1933

1,893,118

UNITED STATES PATENT OFFICE

LESTER N. YOHE, OF NEW OXFORD, AND MARTIN JENSEN, OF HARRISBURG, PENNSYLVANIA

CONTROL SYSTEM FOR AILERONS

Application filed August 8, 1931. Serial No. 555,982.

The present invention relates to aeroplanes and more particularly to an improved control system for the ailerons thereof.

The primary object of the invention is to provide a control system for the ailerons of aeroplanes wherein the ailerons are controlled by torque tubes or rods oppositely rotated thru improved gearing operatively connected with the usual control or joy stick.

A further object of the invention is to provide a control system for ailerons which will be extremely light in weight, insure positive control at all times, and a control system capable of use upon any type of plane.

A further object of the invention is to provide a control system for ailerons allowing for any amount of wing dihedral.

A further object of the invention is to provide a control system for ailerons which is readily applicable to monoplanes of the high, mid, or low wing type as well as to biplanes of various types.

Other objects and advantages of the invention will be apparent during the course of the following detailed description, taken in connection with the accompanying drawings forming a part of this specification and in which drawings:

Figure 1 is a top plan view of a low wing monoplane provided with the improved aileron control system.

Figure 2 is an enlarged and somewhat diagrammatic section on the line 2—2 of Figure 1.

Figure 3 is an enlarged section on the line 3—3 of Figure 1.

Figure 4 is a horizontal section thru the control gear box or casing.

Figure 5 is a section on the line 5—5 of Figure 4.

Figure 6 is a top plan view of a low wing monoplane showing a slightly modified form of control system.

Figure 7 is an enlarged fragmentary section on the line 7—7 of Figure 6.

Figure 8 is an enlarged vertical section thru the control gear box or casing of the control system shown in Figures 6 and 7.

Referring to the drawings in detail, and wherein similar reference characters designate corresponding parts thruout the several views, in Figures 1 to 5 inclusive the aileron control system A has by way of illustration been shown applied to a monoplane B of the low wing type.

The aeroplane B is of usual construction embodying the body or fuselage 10 having the stub wing 11 to which are attached the wings or airfoils 12. The fuselage is provided with the usual cockpit 13 in which the various engine and flight controls are arranged. The wings 12 are provided with the usual front and rear spars 14 and 15 respectively which align with front and rear spars of the stub wing 11, the rear stub wing spar being shown at 15' in Figure 2. In certain types of aeroplane constructions not provided with the stub wing 11, the wing spars form a continuous beam across the fuselage, and the aileron control system as herein disclosed is applicable to such types of aeroplanes.

Provided at the rear or trailing edge of each of the wings 12 is an aileron 16 and in the example shown these ailerons are of the Frieze type aileron, this type of aileron being known as a balanced aileron being hinged at a point below center and rearwardly of the leading edge of the aileron. It is to be understood however, that other types of ailerons having the hinge at the leading edge may be actuated by the control system herein described. The ailerons 16 are each provided with the usual spar 17 which in the type of ailerons shown are spaced rearwardly from the leading edge of the aileron.

Referring now to the control means A for controlling movement of the ailerons 16, the same includes a gear box or casing 20 mounted at the rear side and midway the ends of the rear stub wing spar 15'. This gear box 20 is preferably formed in two sections providing an upper section 21 and a lower section 22 secured together by suitable bolts 23. The sections 21 and 22 when in assembled relation provide at the front of the box a bearing sleeve 24 and at each end of the box, axially aligning bearing sleeves 25 arranged at a right angle to the sleeve 24. Extending into the gear box 20 from the rear side thereof is a center bearing block or extension 26 providing a bearing for a control or rock shaft 27 extending axially thru the front bearing sleeve 24. This center bearing extension 26 provides three right angularly arranged gear pockets 28, 29 and 30 each having parallel confronting flat walls as clearly shown in Figures 4 and 5. These gear pockets 28, 29 and 30 are adapted to respectively receive bevel pinions 31, 32 and 33 arranged in meshing relation, with the faces of the gears having bearing engagement upon the flat confronting walls of the gear pockets. These bevel pinions 31, 32 and 33 are each provided with a tubular hub extension 34 journaled in the respective bearing sleeves for the bevel pinions. Thus the bevel pinions are journaled in right angular relation in the gear box with the pinions 32 and 33 in axial alignment.

The control or rock shaft 27 extends thru the bevel pinion 31 and its sleeve 34 and the pinion is fixed in any manner to the shaft for rotation therewith. Secured to the control or rock shaft is a control stick 35 which when swung to either side imparts rotation to the pinion 31 which in turn imparts opposite rotation to the pinions 32 and 33.

Secured at one end in each of the bevel pinions 32 and 33 is a torque tube or rod embodying stub and main wing sections 36 and 37 respectively, connected by a universal joint 38 arranged at a point closely adjacent the juncture of the wings 12 with the stub wing 11. The inner ends of the torque tubes 36 are journaled in suitable sockets 39 formed in the sides of the center bearing block 26.

As will be observed in Figure 2, the wings 12 incline upwardly from the stub wing 15′ and the universal joints 38 allow for any dihedral angle of the wings. These torque tubes are enclosed in the wing structure and the outer sections 37 are journaled in bearing brackets 40 secured at spaced points along the rear side of the rear wing spars 15. These bearing brackets 40 are formed with rearwardly and downwardly inclined arms 41 which extend below the center and to the rear of the leading edge of the ailerons 16.

Secured to the under side of each of the aileron spars 17, one for each of the bearing brackets 40, is a pivot bracket 42 having pivotal connection at their lower ends with the rear ends of the bearing bracket arms 41 whereby the ailerons may be tilted up or down. Rigidly secured at one end to each of the torque rod sections 37 at a point midway the ends of the ailerons 16 is a lever or horn 43 which projects upwardly from the torque tubes and have pivotally connected to their upper ends, links 44 which extend rearwardly for pivotal connection to a horn 45 carried by and projecting upwardly from the spar 17. Thus it will be seen that upon rotation of the torque tubes, the ailerons will be tilted about an axis at the connection of the arms 41 to the brackets 42.

The bevel pinions 31, 32 and 33 are all of the same size and interchangeable one for another. Considering Figure 2, when the control stick 35 is swung to the left, the bevel pinion 31 will be rotated in a counter-clockwise direction and thru the pinions 32 and 33 rotate the torque shafts in opposite directions so that the left aileron is turned upwardly while the right aileron is turned downwardly. Swinging of the control lever to the right will impart opposite movement to the ailerons. The gear box 20 may be filled with a suitable lubricant and it will be noted that the bevel pinions 32 and 33 aside from imparting rotation to the torque tubes also provide bearings for the inner ends of the torque tubes. By having the bevel pinions engage with a bearing contact the walls of the gear pockets, serve to prevent axial movement of the control shaft and the torque tubes.

Referring now to the aileron control system C shown in Figures 6, 7 and 8, in this system, an arrangement has been provided for eliminating the use of universal joints in the torque tubes. In Figures 6, 7 and 8, like reference characters have been applied to parts corresponding to similar parts as illustrated in Figures 1 to 5 inclusive. In the control system C, the control gear box 50 for mounting upon the rear spar 15′ of the stub wing 11 is so constructed that the torque tubes 51 incline upwardly at degrees corresponding to the dihedral angle of the wings 12. The gear box 50 is constructed with upper and lower sections 52 and 53 respectively connected by suitable bolts 54. The sections when assembled provide a center bearing block or separator 55 providing gear pockets 56 in which are arranged bevel pinions 57 to which the torque tubes 51 are secured. The gear box 50 is machined so that the end bearing sleeves 58, rotatably receiving the hub 59 of the bevel pinions 57, have their axes inclined upwardly at a slight angle to the horizontal so that the torque tubes 51 extend upwardly at a like angle to the wings 12. The gear pockets 56 are also arranged in upwardly converging relation with the walls of the pocket at a right angle to the axis of the pinions 57. A bevel pinion 60 mounted upon the control or rock shaft 61, meshes with the pinions 57 for imparting rotation thereto upon swinging movement of the control stick 35′. Thus, with the form of gear box shown in Figure 8, the torque tubes 51 may be extended parallel to the ailerons without use of universal joints.

In each form of aileron control system A and C it will be noted that the control gear box is attached to the rear side of the rear spar of the stub wing with the torque tubes extending along and journaled upon the rear spar of the main wing. The simplicity of the control system will be readily apparent and positive control of the ailerons is insured thru the bevel gearing. While the size of the parts of the control system will of course vary slightly for various types and sizes of aeroplanes, in a practical embodiment of the invention the control gear box has an overall dimension of between four and five inches and thus it will be seen that a very little space will be required for mounting of the bevel gearing.

From the foregoing it will be seen that an improved and practical form of control system for ailerons has been disclosed which will allow for varying wing dihedrals. It will further be apparent that with this control system, parasite resistance is reduced thru enclosing of the control within the wings. It will further be apparent that a novel arrangement has been provided whereby the rear spar provides a mounting for the control with the gear box for the bevel gearing mounted upon the spar supporting the ailerons.

Changes in the shape, size and arrangement of parts may be made to the forms of invention herein shown and described, without departing from the spirit of the invention or the scope of the following claims.

We claim:

1. In an aileron mounting and control the combination with a wing having a rear spar, of bearing brackets mounted upon the spar and having rearwardly extending arms, an aileron pivotally supported upon the rear ends of the arms at a point below the center and rearwardly of the leading edge of the aileron, a torque tube extending longitudinally along the inner side of the spar and journaled in the bearing brackets, control means for rotating the torque tube, an upstanding horn fixed to the torque tube, an upstanding horn fixed upon the aileron, and a link connecting said horns for imparting tilting movement to the aileron upon rotation of the torque tube.

2. In an aileron control for aeroplanes, the combination with a stub wing having a rear spar, main wings having rear spars inclined upwardly from the stub wing spar, and an aileron mounted upon each main wing rear spar, of a gear box mounted upon the stub wing spar and having mounted therein axially aligning bevel pinions, an inner torque tube section fixed in each pinion for rotation thereby, an outer torque tube section journaled longitudinally of each main wing spar and operatively connected for tilting the ailerons, a universal joint coupling each inner torque tube section to its outer section, a control bevel pinion mounted in the gear box in mesh with each of the first mentioned pinions, and control means for imparting rotation to the control pinion.

3. In an aileron control for aeroplanes, the combination with a stub wing having a rear spar, main wings having rear spars inclined upwardly from the stub wing spar, and an aileron mounted upon each main wing rear spar, of a gear casing mounted upon the stub wing spar and having axially aligning end sleeves and a front sleeve in right angular relation to the end sleeves, a pair of end bevel pinions in the gear casing including tubular hub extensions journaled in the end sleeves, an inner torque tube section fixed in each end pinion in parallel relation to the stub wing spar, an outer torque tube section journaled longitudinally upon each main wing spar and operatively connected for tilting the ailerons, a universal joint connecting each inner torque tube section with its outer section, a control bevel pinion in the gear casing in mesh with the end bevel pinions and including a tubular hub extension journaled in said front sleeve, a control rod fixed in the control pinion, and means for imparting rotation to the control rod.

4. In an aileron control for aeroplanes the combination with a stub wing having a rear spar, main wings having rear spars inclined aileron mounted upon each main wing rear upwardly from the stub wing spar, and an spar, of a gear box mounted upon the stub wing spar and having mounted therein a pair of end bevel pinions having their axes inclined upwardly in parallel relation to the inclination of the main wing spars, a torque tube fixed in each pinion and rotatably supported at their outer end portions upon the main wing spars, means connecting the ailerons for movement by the torque tubes, a control bevel pinion mounted in the gear box in mesh with the end bevel pinions, and control means for imparting rotation to the control pinion.

5. In an aileron control system including a control shaft and a pair of aileron torque tubes intended to be oppositely rotated; drive coupling means between the shaft and tubes comprising a casing provided with a pair of parallel end pockets and a front pocket, a bearing sleeve projecting from each pocket, a torque tube bevel pinion in each end pocket and each having a tubular hub extension journaled in the bearing sleeves, said pinions to have the inner ends of the torque tubes fixed therein, and a control bevel pinion in the front pocket in mesh with the torque tube pinions and having a tubular hub extension journaled in the bearing sleeve of the pocket, said control pinion to have the control shaft fixed therein.

6. In aileron control means, a gear box including separable upper and lower sections, means connecting the sections to provide a closed casing, a center extension on the sections, providing when the sections are assembled, a pair of end pockets and a front pocket all having parallel bearing walls, a bearing sleeve projecting axially from each pocket, an aileron torque tube bevel pinion mounted in each end pocket with the faces thereof engaging the bearing walls of the pockets and each having a tubular hub extension journaled in the bearing sleeves of the pockets, and a control bevel pinion mounted in the front pocket in mesh with the first mentioned pinions with the faces thereof engaging the bearing walls of the pocket and having a tubular hub extension journaled in the bearing sleeve of the pocket, all of said bevel pinions being of a like size.

7. In an aileron control means, a gear casing provided with end pockets and a front pocket, a bearing sleeve projecting from each pocket with the bearing sleeves of the end pockets inclined upwardly, a bevel pinion in each end pocket having hub sleeves journaled in bearing sleeves of the pockets, and a bevel pinion in the front pocket in mesh with the first mentioned pinions and having a hub sleeve journaled in the bearing sleeve of the pocket.

LESTER N. YOHE.
MARTIN JENSEN.